US010362546B2

(12) United States Patent
Kalhan

(10) Patent No.: US 10,362,546 B2
(45) Date of Patent: Jul. 23, 2019

(54) PREAMBLE SYNCHRONIZATION SIGNAL IN UNLICENSED FREQUENCY BAND

(71) Applicant: Kyocera Corporation, Kyoto (JP)

(72) Inventor: Amit Kalhan, San Diego, CA (US)

(73) Assignee: Kyocera Corporation, Kyoto (JP)

(*) Notice: Subject to any disclaimer, the term of this patent is extended or adjusted under 35 U.S.C. 154(b) by 121 days.

(21) Appl. No.: 15/513,103

(22) PCT Filed: Oct. 29, 2015

(86) PCT No.: PCT/US2015/058138
§ 371 (c)(1),
(2) Date: Mar. 21, 2017

(87) PCT Pub. No.: WO2016/069938
PCT Pub. Date: May 6, 2016

(65) Prior Publication Data
US 2017/0251442 A1 Aug. 31, 2017

Related U.S. Application Data

(60) Provisional application No. 62/073,292, filed on Oct. 31, 2014.

(51) Int. Cl.
H04J 11/00 (2006.01)
H04W 16/14 (2009.01)
H04W 56/00 (2009.01)

(52) U.S. Cl.
CPC ....... H04W 56/001 (2013.01); H04J 11/0069 (2013.01); H04W 16/14 (2013.01); H04J 2211/001 (2013.01)

(58) Field of Classification Search
CPC ... H04W 56/00; H04W 16/14; H04W 56/001; H04J 11/0069; H04J 2211/001
See application file for complete search history.

(56) References Cited

U.S. PATENT DOCUMENTS

| | | | |
|---|---|---|---|
| 2013/0315152 A1 | 11/2013 | Ratasuk et al. | |
| 2014/0036853 A1 | 2/2014 | Kim et al. | |
| 2014/0112289 A1* | 4/2014 | Kim | H04W 16/14 370/329 |
| 2015/0085684 A1* | 3/2015 | Sadek | H04W 72/1215 370/252 |
| 2015/0264699 A1* | 9/2015 | Fwu | H04L 5/003 370/329 |
| 2017/0238272 A1* | 8/2017 | You | H04J 11/0073 370/350 |

FOREIGN PATENT DOCUMENTS

WO WO2013-006988 A1 1/2013
WO WO2013-179095 A1 12/2013

* cited by examiner

Primary Examiner — Charles C Jiang
Assistant Examiner — Kyaw Z Soe

(57) ABSTRACT

An eNB transmits a preamble signal including synchronization information before transmitting data in an unlicensed band where the synchronization information is in accordance with a licensed frequency band communication standard used in a primary cell (Pcell) provided by the eNB. The preamble signal is transmitted in accordance with a timing structure used in the Pcell using the licensed frequency band. The eNB provides a secondary cell (Scell) that has a service area that at least partially overlaps with a service area of the Pcell. The preamble signal provides synchronization information to a user equipment (UE) device for the Scell.

16 Claims, 5 Drawing Sheets

PREAMBLE SYNCHRONIZATION SIGNAL IN UNLICENSED FREQUENCY BAND

CLAIM OF PRIORITY

The present application claims priority to Provisional Application No. 62/073,292, US entitled "ENB TRANSMITS PREAMBLE SYMBOLS ON THE UNLICENSED-CARRIER TO HELP UE OBTAIN SYNCHRONIZATION TIMING INFO", filed Oct. 31, 2014, assigned to the assignee hereof, and hereby expressly incorporated by reference.

FIELD

This invention generally relates to wireless communications and more particularly to transmission of preambles with timing information within an unlicensed frequency band.

BACKGROUND

Many communications have timing schemes or timing structures for managing communications between devices. Time can be defined in any number of units and subunits where the communication equipment applies the timing to transmission and reception. For example, some systems divide time into at least frames, subframes, timeslots, and symbol times.

The frequency spectrum used by a particular communication may be licensed or unlicensed. Licensed frequency spectrum (frequency band) is licensed to a system operator by a government agency, such as the Federal Communications Commission (FCC). An example of such licensed spectrum includes frequency bands used for cellular communication. An unlicensed frequency band is any portion of frequency spectrum that does not require a license from the government agency to communicate with the unlicensed frequency band. Equipment operating within the unlicensed band, however, typically must adhere to regulations and/or communication standards. An example of an unlicensed frequency spectrum includes frequency bands used for Institute of Electrical and Electronics Engineers (IEEE) 802.11 communication.

In some communication systems, an eNB (evolved Node B, eNodeB, base station, etc.) uses a licensed frequency band for control signaling and uses the unlicensed frequency band for data transmission to a user equipment (UE) device. The service area provided using the licensed frequency band is sometimes referred to as a primary cell (Pcell) and the service area provided using the unlicensed frequency band is sometimes referred to as a secondary cell (Scell). Although the timing structure (frames, subframes, symbols, etc.) used in the Pcell are applied within Scell, the UE device may not have timing information sufficient to communicate in the unlicensed frequency band. The eNB transmits Discovery Reference Signals (DRS) within the Scell which provides synchronization/timing information to the UE device.

SUMMARY

An eNB transmits a preamble signal including synchronization information before transmitting data in an unlicensed band where the synchronization information is in accordance with a licensed frequency band communication standard used in a primary cell (Pcell) provided by the eNB. The preamble signal is transmitted in accordance with a timing structure used in the Pcell using the licensed frequency band. The eNB provides a secondary cell (Scell) that has a service area that at least partially overlaps with a service area of the Pcell. The preamble signal provides synchronization information to a user equipment (UE) device for the Scell.

DETAILED DESCRIPTION

Figure 1A:
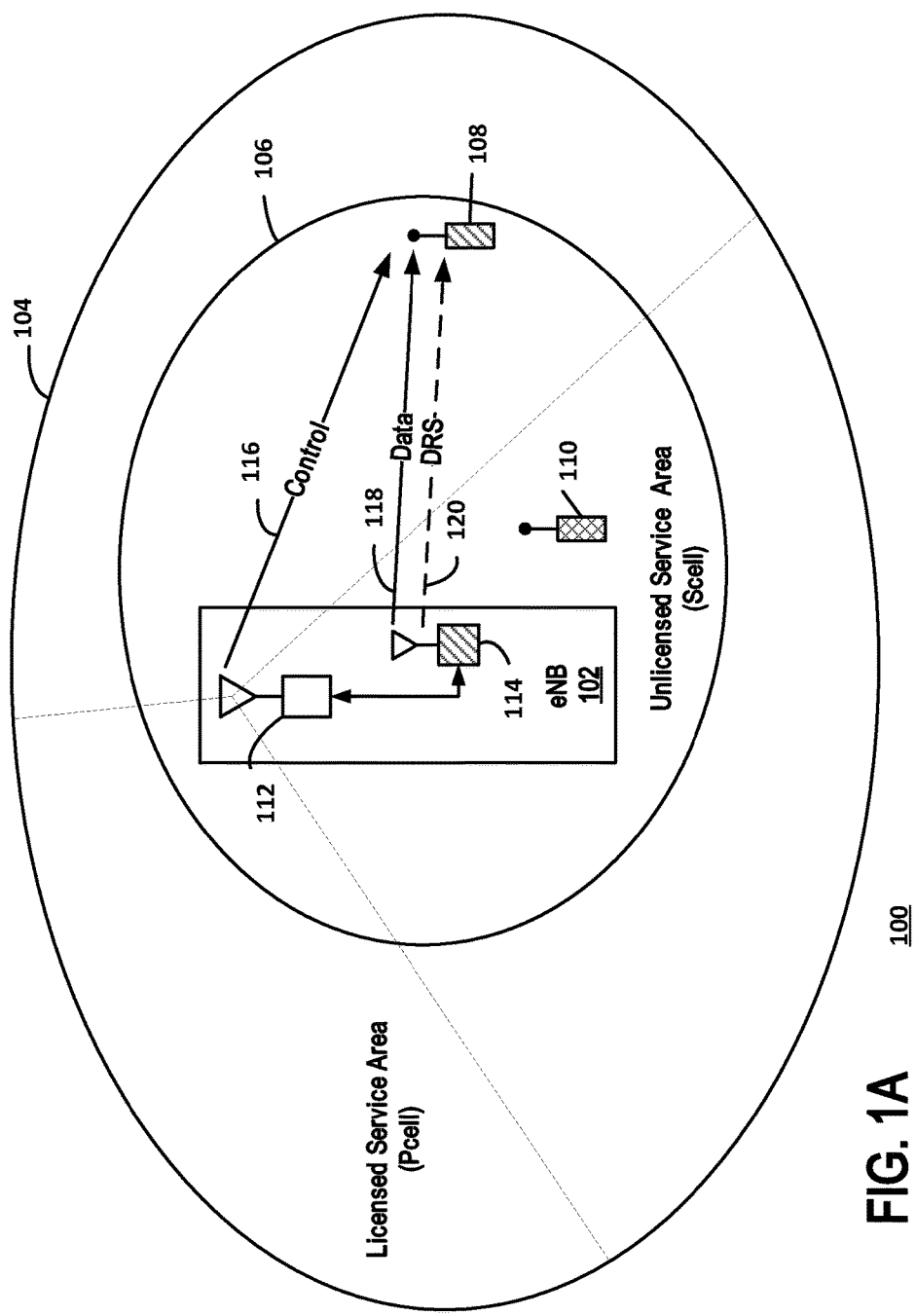
FIG. 1A is a block diagram of a licensed communication system where an eNB provides a primary cell (Pcell) in a licensed service area using a licensed frequency band and provides a secondary cell (Scell) in an unlicensed service area using an unlicensed frequency band.

Although, timing of the Pcell may sometimes be used in the Scell, there are circumstances where the Pcell timing is unavailable or less than adequate for communication in the Scell. In some circumstances, for example, the UE device may not be monitoring the Pcell and will not receive any synchronization information from the Pcell. In other situations, the Scell may not be synchronized to the Pcell. In still other situations the carrier-frequency of the Pcell could be far from the carrier-frequency of the Scell such that the UE device needs to track both the carrier-frequencies individually to achieve required synchronization for the Scell reception.

As discussed above, DRS signals are used in some communication systems to provide timing information to a UE device in the unlicensed frequency band. In some situations, however, the UE device may not receive adequate synchronization information before receiving data from the Scell. In some circumstances, for example, the DRS signals cannot be transmitted to the UE device sufficiently close in time to the data transmission to provide adequate synchronization information. Such a circumstance may arise where the UE device wakes up after being in sleep mode for a significant time and no DRS has been received before data is transmitted in the Scell. One situation where the DRS signal may not be received occurs where the eNB detects energy when monitoring the unlicensed frequency band and determines that the DRS should to be transmitted. In another situation, the communication traffic from other devices in the unlicensed frequency band interferes with the DRS to prevent adequate reception of the DRS at the UE device.

For the examples herein, however, the eNB transmits a preamble signal including timing (synchronization) information to the UE device prior to the data transmission in the unlicensed band in the Scell. The synchronization information is based on a sequence generated in accordance with at least one revision of the communication standard used in the Pcell. For the examples herein, the preamble signal includes at least a portion of a subframe where signal has a sequence based on one or more of a Primary Synchronization Signal (PSS) and a Secondary Synchronization Signal (SSS) in accordance with at least one revision of the 3GPP LTE communication standard.

The timing and the timing structure used for communication by communication equipment in the licensed frequency band in the (Pcell) are used by the communication equipment to communicate using the unlicensed frequency spectrum in the Scell. As discussed herein, "timing structure" and "timing scheme" refer to the divisions and subdivisions in time for managing communication. The timing structure in the examples below includes dividing time into at least frames, subframes and timeslots and symbol times. As discussed herein "timing" refers to points in time and periods of time. More specifically, using the same timing requires that the boundaries of the smallest division of time in the timing structure be aligned. By applying the timing of the licensed system to the unlicensed frequency band, therefore, communication events are aligned in time and are synchronized. Although the timing structure used in the unlicensed frequency band can be applied such that it is aligned with the timing structure in the licensed frequency, the timing of the licensed system can be applied to communication in the unlicensed frequency band without aligning the timing structure. For example, the timing structure used in the unlicensed frequency band may be offset from the timing structure in the licensed frequency band by some multiple of symbol times. Since the timing used in the licensed frequency band is applied to the unlicensed frequency band, however, the boundaries of the symbol times in the unlicensed frequency band are aligned with the symbol time boundaries in the licensed frequency band. Before a transmitting device transmits within the unlicensed frequency band, the unlicensed frequency band is monitored for radio frequency energy to determine if the spectrum is currently being used. If no energy is detected, or the level is below a threshold, it is determined that the unlicensed band can be used by the transmitter. For the examples discussed below, the unlicensed band is monitored in a subframe previous to the subframe where the transmitting device will transmit over the unlicensed frequency band. Although a UE device can be the transmitting device, for the discussion herein, the transmitting device is an eNB transmitting to a UE device where the eNB monitors the unlicensed frequency band prior to transmission.

FIG. 1A is a block diagram of a licensed communication system 100 where an eNB 102 provides a primary cell (Pcell) in a licensed service area 104 using a licensed frequency band and provides a secondary cell (Scell) in an unlicensed service area 106 using an unlicensed frequency band. The licensed communication system 100 may be any communication system that uses a portion of frequency spectrum (frequency band) that is licensed to the system operator by a government agency, such as the Federal Communications Commission (FCC). For the examples discussed herein, the licensed communication system 100 is a cellular system that operates in accordance with at least one revision of The Third-Generation Partnership Project Long-Term Evolution (3GPP LTE) communication specification. Examples of licensed frequency bands include Advanced Wireless Service (AWS) 4G frequencies in the range of 1,710-1,755 and 2,110-2,155 MHz. The unlicensed frequency band is any portion of frequency spectrum that does not require a license from the government agency to communicate with the unlicensed frequency band. Equipment operating within the unlicensed band, however, typically must adhere to regulations and/or communication standards. Examples of unlicensed bands include frequency bands used for IEEE 802.11 standards that comply with the FCC Rules and Regulations, such as WiFi, Bluetooth, and Zigbee. For the example of FIG. 1A, the eNB 102 provides wireless service to user equipment (UE) devices 108 within a geographical service area (licensed service area) 102 using one or more licensed frequency bands.

A cellular communication system is typically required to adhere to a communication standard or specification. The communication specification defines at least a data channel and a control channel for uplink and downlink transmissions and specifies at least some timing and frequency parameters for physical downlink control channels from a base station to a wireless communication device. The Third-Generation Partnership Project Long-Term Evolution (3GPP LTE) communication specification is a specification for systems where communication stations (eNodeBs) provide service to wireless communication devices (UE devices) using orthogonal frequency-division multiple access (OFDMA) on the downlink and single-carrier frequency-division multiple access (SC-FDMA) on the uplink. Although the techniques described herein may be applied in other types of communication systems, the exemplary systems discussed herein operate in accordance with an FDD 3GPP LTE communication specification.

The eNB 102 can be any type of communication station and may be referred to as a base station, eNodeB, fixed station, access point, and other terms. The eNB 102 is typically connected within a network of several other eNBs through a backhaul. The UE device 108 is any type of user device and is sometimes referred to by other terms such as, for example, handset, phone, smartphone, mobile device, portable device, and modems. Communication using the licensed band may include downlink transmissions from the eNB to UE devices, uplink communication from UE devices to the eNB, and device-to-device (D2D) communication between two or more UE devices.

Other unlicensed devices 110 within the licensed service area 102 use an unlicensed frequency band for communication. The unlicensed devices may include access points 112 providing service to mobile devices and devices operating in device-to-device communication scenarios. The unlicensed communications may be ad hoc communication scenarios and may be bidirectional or one way. Accordingly, the unlicensed devices 110 may include various types of devices and equipment.

For the examples herein, the licensed equipment 102, 108 uses the unlicensed frequency band for communication at times determined to avoid interference or at least to result in a tolerable level of interference with communication between unlicensed devices and, in some situations, other licensed devices using the unlicensed frequency band. The unlicensed frequency band is monitored prior to transmission to determine if the band is currently in use. If it is determined that the band is not in use, the licensed equipment transmits signals within the unlicensed frequency band.

The licensed communication system 100 uses timing and a timing structure to transmit and receive signals where the timing structure divides and organizes time into an arrangement of units and subunits. For the examples herein, the timing structure adheres to at least one revision of the 3GPP LTE standard and includes at least frames, subframes, timeslots, and symbol times.

The system timing structure and timing of the licensed system 100 is applied to the unlicensed frequency band such that transmissions within the unlicensed band correspond to the timing of the licensed system. For example, signals may be transmitted within the unlicensed band at particular subframes or time slots that are aligned with the subframes and times slots of the licensed frequency band. In some circumstances, the signals may also be transmitted in the unlicensed frequency band using the same timing structure as used in the licensed band but an offset by multiple timing units (e.g., symbol periods). In some situations, therefore, the eNB 102 uses the unlicensed frequency band for communication with UE devices 108. The eNB includes a licensed band transceiver 112 that provides the PCell and an unlicensed band transceiver 114 that provides the Scell. For the example of FIG. 1A and FIG. 1B, the geographic service areas 104, 106 are represented by circular regions where the Scell is smaller and contained completely with the Pcell. Although the service areas 104, 106 may have any of numerous sizes, shapes and relationships to each other, the Scell at least partially overlaps with the Pcell. The transceivers 112, 114, sometimes referred to by other terms such as radio heads, are any combination of electronics and code that facilitate transmission and reception of wireless signals. The licensed band transceiver 112 transmits and receives signals within the licensed frequency band and the unlicensed band transceiver 114 transmits and receives signals within the unlicensed frequency band. In one arrangement, the eNB transmits control information 116 in the licensed frequency band and transmits data 118 in the unlicensed frequency band. In some situations, the two transceivers 112, 114 are collocated and/or are sufficiently connected to each other to maintain synchronization between the signals transmitted in each frequency band. In other situations, however, the two transceivers are not adequately synchronized and additional measures must be taken to allow proper communication with UE devices. Also, even if the two transceivers are synchronized, there may be situations where the UE device does not receive timing information from the Pcell. Accordingly, other measures are typically taken to provide timing to the UE device in the Scell. For example, Discovery Reference Signals (DRS) 120 transmitted by the eNB on the unlicensed Scell carrier can be used for synchronization. In response to the eNB's request, each UE device receives periodic DRS transmitted by the eNB on the unlicensed Scell carrier. A DRS consists of Primary Synchronization Signal/Secondary Synchronization Signal (PSS/SSS) and cell-specific reference signal (CRS) or Channel State Information Reference Signal (CSI-RS) signals. The UE device sends the DRS received quality CSI reports to the eNB which uses the CSI reports to schedule the UE device on the unlicensed Scell carrier. In addition to discovery of the Scell and the scheduling decisions, the DRS assist the UE devices in time/frequency tracking and subframe boundary detections in the Scell.

In some circumstances, however, the DRS 120 cannot be received by the UE device either because the DRS is not transmitted, because other transmissions from other unlicensed devices interfere with the DRS, or because the DRS cannot be received in time for the data transmission. The DRS 120 in FIG. 1A is shown with a dashed lines to indicate that the DRS may not be received at the UE device. The eNB 102 senses, or otherwise monitors, the unlicensed frequency band before transmitting signals to avoid interfering with other communications in the unlicensed frequency band. If the eNB detects energy within the unlicensed frequency band before a scheduled DRS transmission, the DRS is not transmitted. It is also possible that an unlicensed device transmits a signal at the same time that a DRS is transmitted. If the relative energy of the signal is high enough, the UE device will not be able to make use of the DRS. As a result, the UE device may not obtain the timing required to properly receive data transmitted in the unlicensed frequency band. As discussed herein, however, the eNB transits, in the Scell, a preamble synchronization signal that includes synchronization information prior to the transmission of data, allowing the UE device to obtain the timing prior to reception of the data.

Figure 1B:
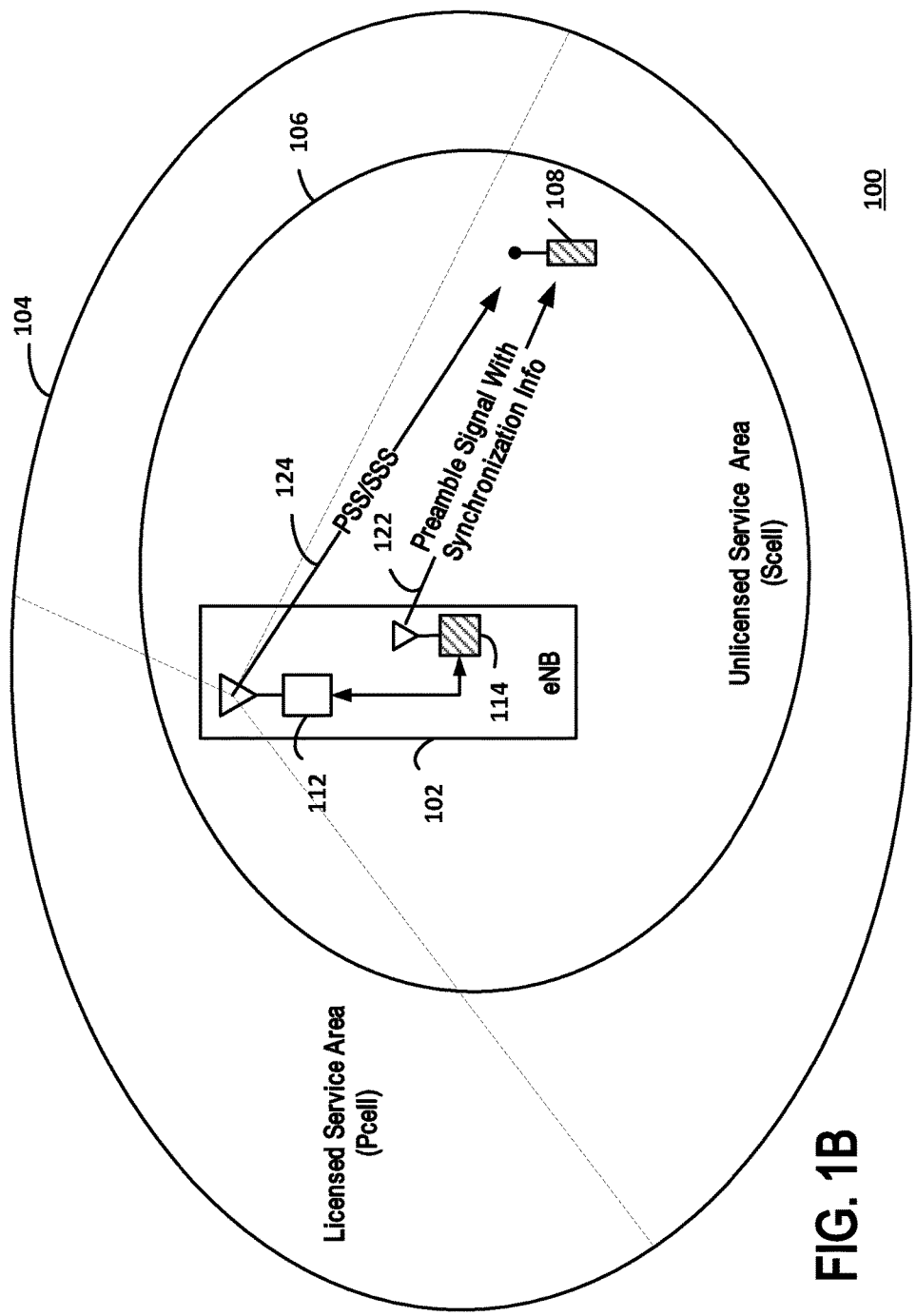
FIG. 1B is a block diagram of the communication system where the eNB transmits a preamble including timing information prior to transmitting data in the unlicensed frequency band.

FIG. 1B is a block diagram of the communication system 100 where the eNB 102 transmits a preamble synchronization signal 122 including synchronization information prior to transmitting data 118 in the unlicensed frequency band. The eNB provides synchronization information to the UE device 108 by transmitting PSS/SSS in the licensed frequency band. As discussed above, there are situations where the timing in the Pcell cannot be used by the UE device to receive signals in the Scell. The unlicensed transceiver 114 may not be synchronized to the licensed transceiver 112 in some situations. In other situations, the UE device may not be monitoring the Pcell and cannot receive the synchronization information from the Pcell. The preamble synchronization signal 122 provides unlicensed frequency band timing information to the UE device. As discussed below, the preamble synchronization signal may include a plurality of preamble symbols where one or more of the preamble symbols is embedded with a PSS/SSS sequence. The preamble synchronization signal includes other preamble symbols that serve as reserve symbols. The reserve symbols may include any data or random sequences and provide a mechanism for occupying the unlicensed frequency band with energy that is detected by other devices that will refrain from transmitting in the band in response to detecting the energy. For the examples herein, the reserve preamble symbols are embedded with a cell-specific sequence allowing other equipment to identify the source of the preamble transmission.

Figure 2:
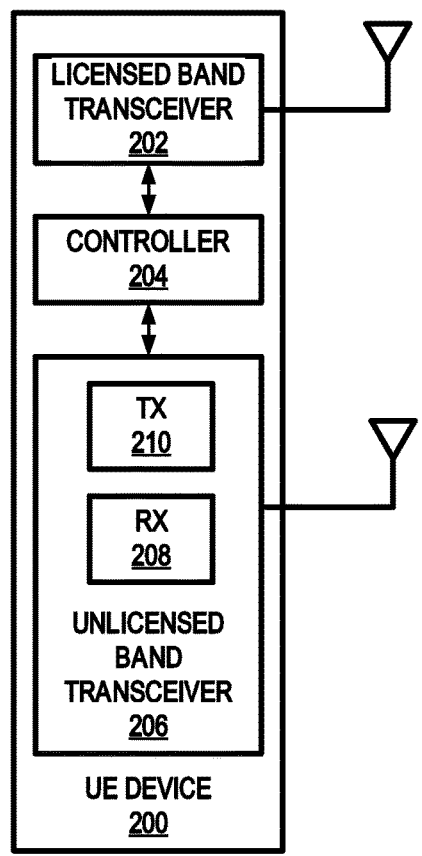
FIG. 2 is a block diagram of an example of a UE device suitable for use as the UE device in FIG. 1A and FIG. 1B.

FIG. 2 is a block diagram of an example of a UE device 200 suitable for use as the UE device 108 in FIG. 1A and FIG. 1B. The UE device 200 includes a licensed band transceiver 202, a controller 204, as well as other components and circuitry (not shown) such as memory, for example. For the examples herein, each UE device also includes an unlicensed band transceiver 206 which includes an unlicensed band receiver 208 and an unlicensed band transmitter 210. The unlicensed band transmitter 210 transmits signals over the unlicensed frequency band where, depending on the situation, the signals may provide uplink control information to the eNB, uplink data information to the eNB, D2D control information to another UE, and/or D2D data information to another UE device. The unlicensed band transmitter 210 may be omitted from the UE device 200. This may be the case where the UE device 200 is used to only monitor the unlicensed band and/or only to receive signals within the unlicensed band. The unlicensed band receiver 208 receives signals over the unlicensed frequency band where, depending on the situation, the signals may provide downlink control information from the eNB, downlink data information from the eNB, D2D control information from another UE, and/or D2D data information from another UE device. For the examples discussed herein, the preamble synchronization signal 122 is received by the unlicensed frequency band receiver 208.

The licensed band transceiver 202 includes a transmitter that transmits uplink wireless signals to the eNBs and a receiver that receives downlink wireless signals from the eNBs within the licensed frequency band. The transceiver can also be configured to transmit and receive D2D signals using allocated licensed uplink communication resources. The controller 204 controls components of the UE device 200 to manage the functions of the device 200 described herein as well as to facilitate the overall functionality of the device 200. The controller 204 is connected to the transceivers 202, 208 and other components, such as memory.

Figure 3:
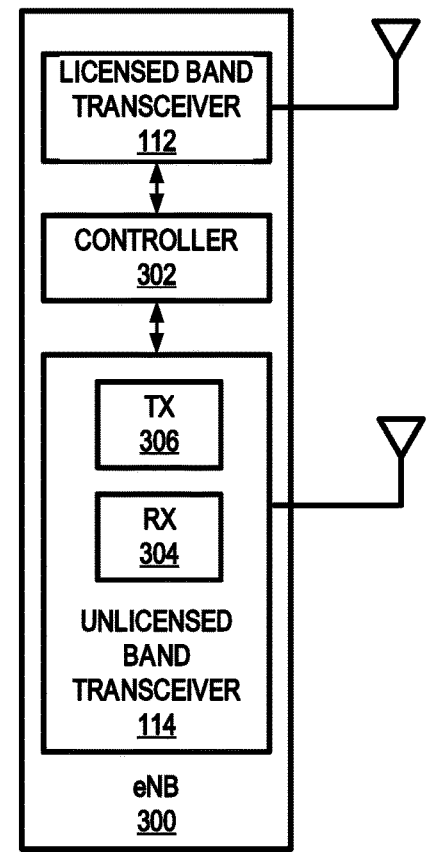
FIG. 3 is a block diagram of an example of an eNB suitable for use as the eNB in FIG. 1A and FIG. 1B.

FIG. 3 is a block diagram of an example of an eNB 300 suitable for use as the eNB 102 in FIG. 1A and FIG. 1B. The eNB 300 includes a licensed band transceiver 112, a controller 302, as well as other components and circuitry (not shown) such as memory, for example. For the examples herein, the eNB also includes an unlicensed band transceiver 114 which includes an unlicensed band receiver 304 and an unlicensed band transmitter 306. The unlicensed band transmitter 306 transmits signals over the unlicensed frequency band where, depending on the situation, the signals may provide downlink control information to the UE device and downlink data information to the UE device. The unlicensed band transmitter 306 is also used to transmit the preamble synchronization signal 122 in the unlicensed frequency band. The licensed band transceiver 112 can exchange wireless signals with the UE device 108 within the service area 104. Transmissions within the licensed band from the eNB and from the UE devices are governed by a communication specification that defines signaling, protocols, and parameters of the transmission with the frequency band licensed to the operator of the licensed system 100. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels. As discussed below in further detail, at least one of the timing parameters is applied to the unlicensed frequency band.

Figure 4:
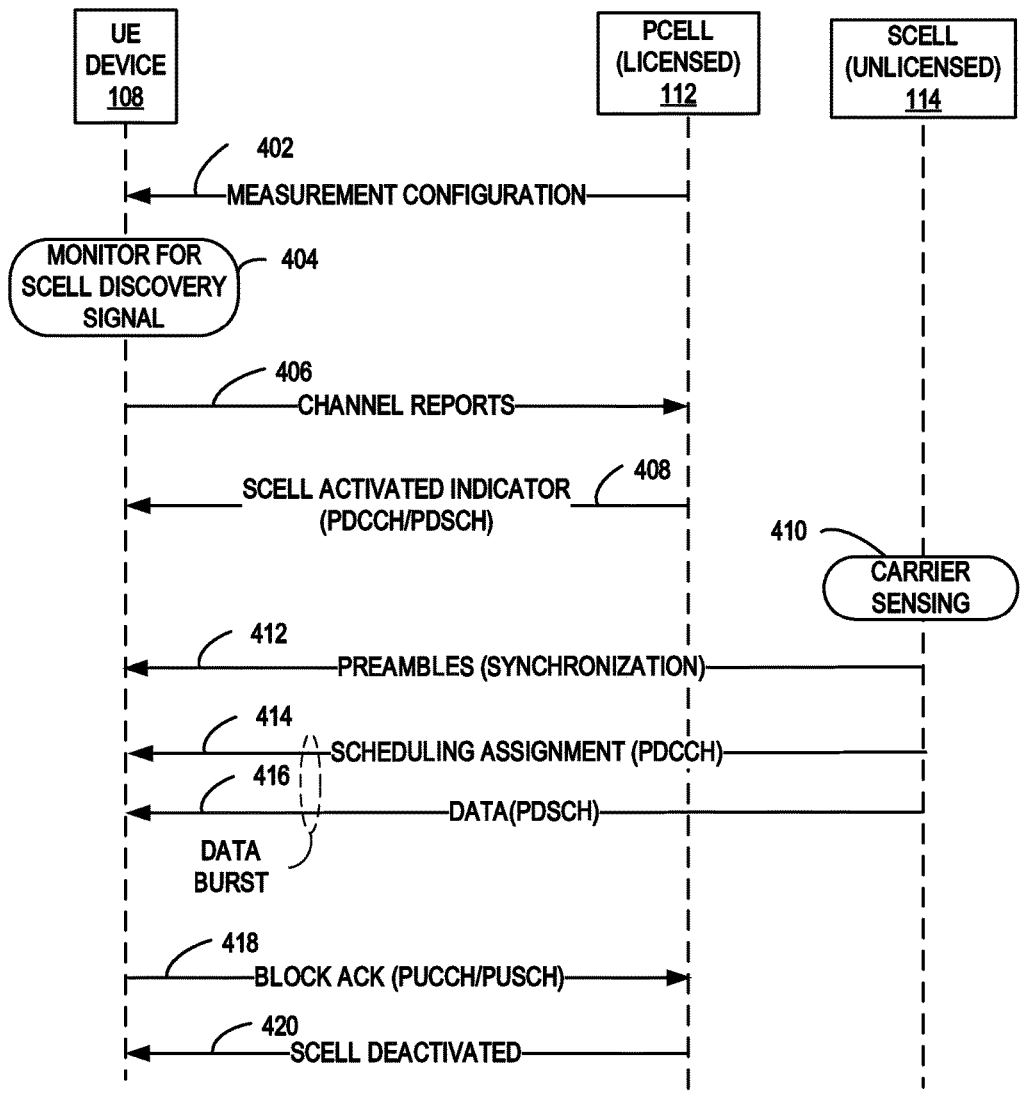
FIG. 4 is a message diagram of messages between a Pcell, Scell, and UE device for an example where the Scell transmits a preamble prior to transmission of a data burst.

FIG. 4 is a message diagram of messages between a Pcell, Scell and UE device, for an example where the Scell transmits a preamble synchronization signal prior to transmission of a data burst.

At transmission 402, the Pcell (licensed transceiver 112) transmits measurement configuration message to the UE device 108. The measurement configuration instructs the UE device to monitor and measure the discovery signal transmitted by the Scell (unlicensed transceiver 114). At event 404, the UE device 108 performs the measurement procedure in accordance with the measurement configuration.

At transmission 406, the UE device sends the channel measurement reports to the eNB (Pcell) over the licensed frequency band. The reports are transmitted in accordance with conventional techniques such as those used in 3GPP LTE systems.

At transmission 408, the Pcell transmits the Scell activated indicator. The indicator indicates that the Scell has been activated and is transmitted in accordance with known techniques. The Scell activated indicator can be transmitted over a downlink control or data channel (PDCCH/PDSCH). In some situations, the Scell activated indicator can be transmitted before the measurement configuration message.

At event 410, the Scell performs carrier sensing of the unlicensed frequency band. The receiver in the unlicensed transceiver monitors the unlicensed frequency band for signal energy. If no energy is detected or if the energy is below a threshold, the Scell transmits a preamble synchronization signal at transmission 412. The preamble synchronization signal is transmitted in the last portion of the subframe prior to the subframe that will be used for the data burst. For the examples herein, the preamble synchronization signal consists of a plurality of one symbol preambles where the last to symbols include PSS/SSS and the other symbols include preambles having a cell specific sequence unique to the Scell.

At transmission 414, the Scell transmits a scheduling assignment identifying the communication resources that will be used for the data transmission. For the example, the scheduling assignment is transmitted over the PDCCH in the unlicensed frequency band by the transmitter in the unlicensed transceiver.

At transmission 416, the data is transmitted in the unlicensed frequency band to the UE device. For the example, the data is transmitted over the PDSCH in the unlicensed frequency band.

In response to successful reception of the data burst, the UE transmits an acknowledgment (block ACK) to the Pcell at transmission 418. For the example, the UE transmits the block ACK over the PUCCH/PUSCH in the licensed frequency band.

The eNB deactivates the Scell and transmits an Scell deactivation message to the UE device at transmission 420. For the example, the licensed transceiver transmits the message over in the licensed frequency band using the PDCCH/PDSCH.

Figure 5:
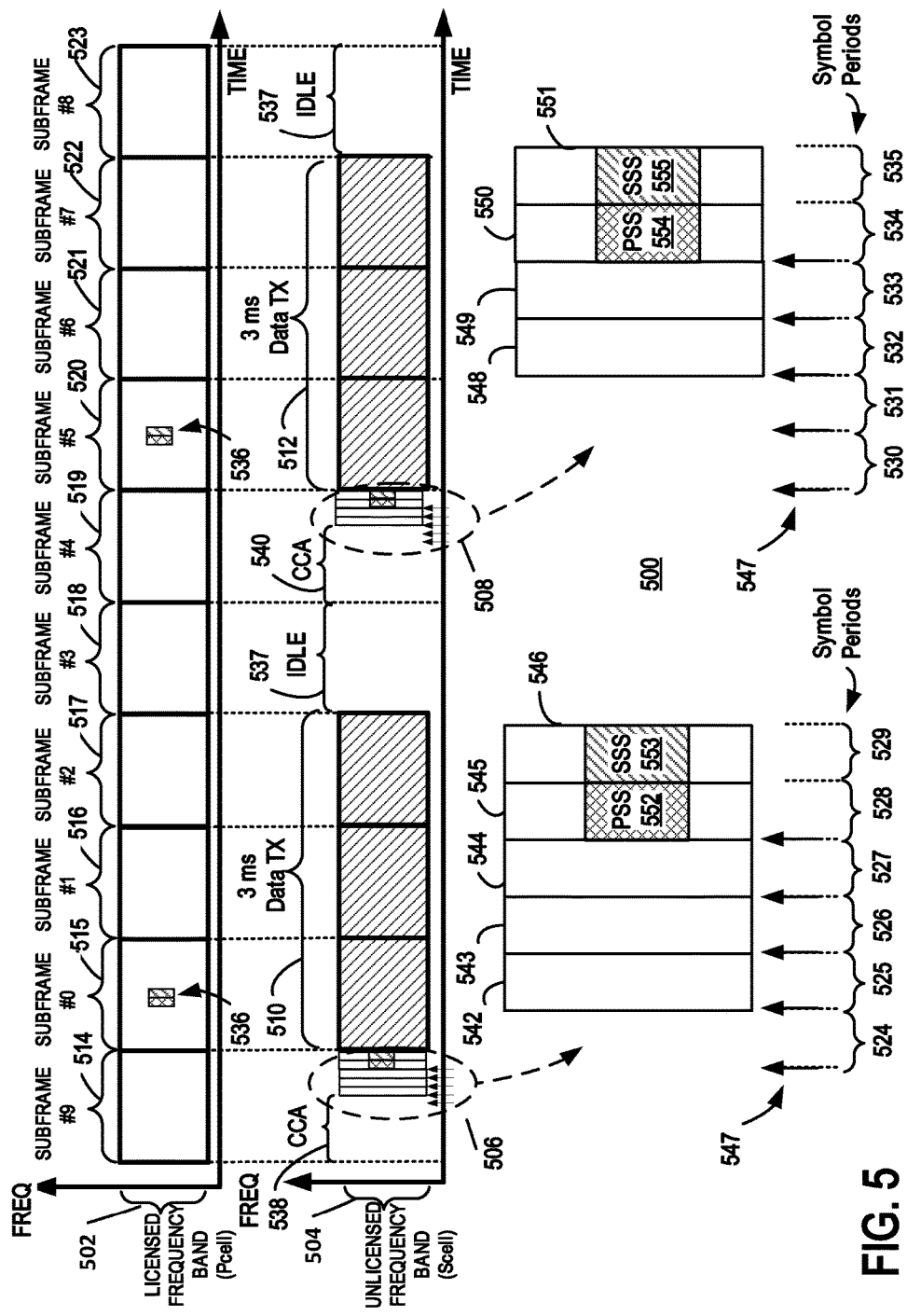
FIG. 5 is an illustration of the transmissions by the eNB, as received by the UE device, in the licensed frequency band and the unlicensed frequency band for an example where preambles are transmitted in the unlicensed frequency band prior to transmission of data bursts.

FIG. 5 is an illustration of the transmissions by the eNB, as received by the UE device, in the licensed frequency band 502 and the unlicensed frequency band 504 for an example where preamble synchronization signals 506, 508 are transmitted in the unlicensed frequency band prior to transmission of data bursts 510, 512. For the example of FIG. 5, the timing structure used by the eNB in the licensed frequency band 502 is used for communication in the unlicensed frequency band 504. The illustration of FIG. 5 is a frequency-time graph 500 showing frequency-time resource elements in the licensed frequency band 502 and the timing structure applied to the unlicensed frequency band 504. The graph is not necessarily drawn to scale and only provides an exemplary visual representation. The timing structure used by the eNB in the licensed frequency band is at least partially based on the communication specification with which the system operates and on the regulations of the frequency band. Time can be organized in numerous ways to establish the timing structure (timing scheme) of the system. For the examples herein, time is at least organized into frames, subframes 514-523, time slots, and symbol times 524-535. For the example, the timing and the timing structure used in the licensed frequency band 502 is in accordance with one or more revisions of the 3GPP LTE communication specification. A similar timing structure is applied to the unlicensed frequency band 504.

Although the subframe boundaries in the unlicensed frequency band are shown as aligned to the subframe boundaries in the licensed frequency band, it is assumed that the UE device is not synchronized to the Scell for the example. In addition, no DRS has been received by the UE device to provide adequate synchronization information for the Scell prior to the data transmissions. The eNB Pcell periodically transmits primary synchronization signals and secondary synchronization signals (PSS/SSS) 536 in the licensed frequency band 502. Although the synchronization information assists in maintaining proper timing for communication in the Pcell, this synchronization information may be inadequate to maintain timing in the Scell. For example, the Scell may not be synchronized to the Pcell or the UE device may not be monitoring the Pcell channels. For the techniques discussed herein, however, the Scell provides synchronization information to the UE device by transmitting a preamble synchronization signal 506, 508 prior to a data burst 510, 512 in the unlicensed frequency band 504. Two data bursts 510, 512 and, therefore, two preamble synchronization signals 506, 508 are shown in the example of FIG. 5. As discussed below, each preamble synchronization signal transmission may have a different number of symbol preambles. Since the transmissions are in the unlicensed frequency band, the eNB Scell monitors the unlicensed frequency band for energy before transmission. The eNB Scell monitors the unlicensed frequency band using techniques such as listen-before-talk (LBT) or clear channel assessment (CCA) procedures. For the example, the eNB performs a CCA procedure in accordance with at least one revision of the IEEE 802.11 standard. Each data transmission includes a plurality of consecutive subframes. For the example, each data transmission 510, 512 is three subframes (3 ms) long. The data transmission, however, can have any length. In some situations, for example, the data transmission is 4 ms long. The eNB Scell may not transmit signals in some subframes. For the example of FIG. 5, the eNB Scell is idle during the idle period 537 in subframe #3 518 and subframe #8 523, performs CCA procedures in CCA periods 538, 540 for portions of subframe #9 514 and subframe #4 519, and transmits preamble synchronization signals 506, 508 in the remainder of the subframes 514, 519. The Scell transmits data in subframe #0 515, subframe #1 516, and subframe #2 517 for the first transmission 510 and in subframe #5 520, subframe #6 521, and subframe #7 522 for the second transmission 512. In some situations, the eNB may transmit reservation symbols without synchronization symbols. Such a situation may occur where the UE device has received the synchronization information in a previous burst.

For the first transmission, the eNB Scell monitors the unlicensed frequency band by performing a CCA procedure in the CCA period 538 in subframe #9 514 prior to the preamble synchronization signal transmission. If the eNB determines that no other devices are using the unlicensed frequency band, the Scell sends the preamble synchronization signal transmission 506 which includes a plurality of preamble synchronization signal symbols 542-546. The preamble synchronization signal transmissions can begin at any of several symbol edges 547. The preamble synchronization signal transmission 506 begins at a symbol edge of a symbol 525.

For the second transmission, the eNB Scell monitors the unlicensed frequency band by performing a CCA procedure in the CCA period 540 in subframe #4 519 prior to the preamble synchronization signal transmission 508. If the eNB determines that no other devices are using the unlicensed frequency band, the Scell sends the preamble synchronization signal transmission 508 which includes a plurality of preamble synchronization signal symbols 548-551. The preamble synchronization signal transmissions can begin at any of several symbol edges 547. The preamble synchronization signal transmission 508 begins at a symbol edge of a symbol 532.

Each preamble synchronization signal 506, 508 includes at least one synchronization symbol 545, 546, 550, 551 and may include one or more reservation symbols 542, 543, 544, 548, 549 where the at least one synchronization symbol is transmitted in the last symbol 529, 535 of the subframe 514, 518 prior to the subframe 515, 520 including the data. The reservation symbols occupy the unlicensed frequency band to "reserve" the channel prior to the eNB transmissions of the synchronization symbols and data. Other devices performing LBT and/or CCA procedures detect the preamble synchronization signal, including the reservation symbols, and refrain from transmitting in the unlicensed frequency band. The reservation symbols may have any type of data or sequence that occupies the channel. The sequence may be random in some situations. The sequence may also be a repeating sequence or a predetermined set sequence. For the preamble synchronization signal transmissions 506, 508 in the example of FIG. 5, the reservation symbols 542, 543, 544, 548, 549 that occupy the unlicensed frequency band to "reserve" the channel prior to the eNB transmissions are cell-specific symbol preamble synchronization signals that have a cell-specific sequence unique to the Scell. In some situations, one or more of the reservation symbols may have sequences other than cell-specific sequences.

The preamble synchronization signals 506, 508 also include at least one synchronization symbol (545, 546, 550, 551) where the synchronization symbol has a sequence (552, 553, 554, 555) generated in accordance with the technique used to generate synchronization sequences in the licensed frequency band. For example, the technique used to generate the sequences for the PSS and the SSS in 3GPP LTE systems can be used to generate a PSS preamble symbol and/or a SSS preamble symbol for transmission in the Scell. In LTE, the PSS and SSS are based on the cell ID of the cell transmitting the PSS/SSS. A total of 504 possible cell IDs are defined into three groups of 168 cell IDs. The PSS provides a 5 ms timing (half-frame), the position of the SSS and the cell ID within the group, but does not identify the group itself. The PSS, therefore, allows the UE device to identify the half frame subframe boundary without identifying which half frame. The SSS indicates whether it is in the #0 subframe or the #5 subframe and identifies the cell ID group (i.e., groups 1, 2, or 3). Accordingly, the SSS in subframe #0 is different than the SSS in subframe #5. Therefore, when the UE device detects the SSS in subframe #0, the UE device determines that the current timing is in the first half of the frame. Similarly, when the UE device detects the SSS located in subframe #5, the UE device determines that current timing is in the second half of the frame. The PSS preamble symbol and the SSS preamble symbol in the Scell can be based on sequences generated in the same way as in the Pcell but for the cell ID of the Scell rather than the Pcell. In some situations, the sequences of the PSS and SSS symbols may be based on a unique identifier other than a cell ID. Further, it is possible that the SSS identifies whether the SSS is transmitted in the first half frame or the second half frame even though the SSS is transmitted in a subframe other than the #0 subframe or #5 subframe. Regardless of the information used to generate the PSS and SSS, the preamble synchronization signal in the Scell identifies the subframe boundary, uniquely identifies the Scell, and allows the UE device to determine the current subframe number.

Each sequence may be transmitted within the center of the subcarrier set of the symbol as is typically done in LTE systems. Accordingly, each synchronization symbol shows the PSS/SSS within the center portion of the symbol in FIG. 5. The remainder of the subcarriers may be used for other control or data. In some situations, the full frequency band of all the subcarriers of the symbol may be used for the PSS or SSS sequence. Such a technique makes the synchronization symbol more robust and easier to decode by the UE device. In situations where the UE device tunes to the unlicensed frequency band late in the subframe (e.g., UE device wakes up from sleep immediately before transmission burst), only a portion of the SSS symbol may be received to provide adequate synchronization information. A robust SSS symbol structure facilitates successful reception of the SSS symbol within a relatively small time period.

As discussed above, the preamble synchronization signal transmissions may have different numbers of preamble symbols. The second preamble synchronization signal transmission 508, for the example, includes two cell specific symbol preambles 548, 549, a PSS symbol preamble 550, and an SSS symbol preamble 551. The first cell specific symbol preamble 548 begins at the symbol edge of a symbol 532. For the examples herein, each preamble synchronization signal transmission includes at least the PSS symbol preamble and a SSS symbol preamble. In some situations, however, only one of the PSS/SSS symbol preambles is transmitted and/or received. Also, in circumstances, only a portion of a preamble symbol may be received by the UE device. This may occur, for example, where the UE device did not have adequate time to receive the entire last preamble symbol. This may also occur where the eNB is unable to transmit the full symbol because the unlicensed frequency band is occupied and is clear only during the last portion of the symbol. The number of cell specific symbol preambles depends on the location within a subframe where the unlicensed frequency band is determined to be clear based on the CCA and/or LBT procedures. The earlier in a subframe where the frequency band is determined to be clear, the larger number of preamble symbols the preamble synchronization signal transmission contains. This is because, for the examples, the preamble synchronization signal is transmitted from the time the frequency band is determined to be clear until the next subframe. In addition to providing synchronization information, the preamble synchronization signal reserves the frequency band by occupying the channel with energy that can be detected by other devices. As discussed above, the preamble synchronization signal may include a series of reserve symbols prior to the PSS/SSS preamble symbols.

For the examples, at least an SSS preamble symbol 546 and an SSS preamble symbol 551 is transmitted as part of the preamble synchronization signal transmission. Where the frequency band is determined to be clear at the end of a subframe, the preamble synchronization signal transmission may begin in the first symbol in the next subframe and continue until the last symbol in the subframe, thereby occupying the entire subframe before data transmission.

The length of the preamble synchronization signal transmission can be adjusted based on several factors. For example, the eNB may reduce the number of preamble symbols when the communication traffic in the unlicensed band is relatively high. In other words, the eNB can fairly share the unlicensed frequency band with other devices by not "reserving" the channel with long preamble transmissions during high traffic times. Accordingly, the implementation parameter may be a maximum number of preamble symbols that is based on the current traffic in the unlicensed frequency band.

The examples discussed herein have advantages over conventional techniques. As discussed above, the transmission of the PSS/SSS symbols in the unlicensed frequency band allows the UE devices to locate the subframe boundaries when the Pcell and the Scell are not synchronized and the eNB is unable to transmit DRS prior to a data burst. Another advantage includes providing the option of longer-duration of the DRS periods.

In addition, neighboring eNBs can detect the preamble synchronization signal of the eNB and determine the transmission duration and, therefore, the length of time that the channel will be occupied. The neighboring eNBs can avoid monitoring the unlicensed frequency band during these times and more efficiently access the band. An eNB can wait a known number of subframes before attempting to access the band.

Transmitting the preamble synchronization signal in the subframe prior to the transmission burst provides the option of not transmitting the PSS/SSS during the subframes of the data burst. As a result, the symbols that would have been used for PDSS/SSS can be used for data (PDSCH).

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
transmitting, to a user equipment (UE) device and from a licensed band transceiver providing a primary cell (Pcell), control signals within a licensed frequency band using a timing structure comprising frames, subframes and timeslots, the timing structure in accordance with a communication specification;
transmitting, from an unlicensed band transceiver providing a secondary cell (Scell), a preamble synchronization signal within an unlicensed frequency band using the timing structure within at least a portion of a subframe, at least one symbol of the preamble synchronization signal having a sequence generated in accordance with a synchronization signal generation technique used in the Pcell, and at least one symbol of the preamble synchronization signal comprising a preamble reservation symbol that is a cell-specific preamble symbol having a sequence unique to the Scell; and
transmitting, from the unlicensed band transceiver, a data burst within the unlicensed frequency band using the timing structure and within a next subframe immediately after the subframe.

2. The method of claim 1, wherein the communication specification is The Third-Generation Partnership Project Long-Term Evolution (3GPP LTE) communication specification and the timing structure is in accordance with at least one revision of the 3GPP LTE communication specification.

3. The method of claim 2, further comprising:
monitoring the unlicensed frequency band;
determining, at least partially based on the monitoring, whether the unlicensed frequency band is in use; and
transmitting, from the unlicensed band transceiver, the preamble synchronization signal within the unlicensed frequency band only if the unlicensed frequency band is determined to not be in use.

4. The method of claim 3, wherein transmitting the preamble synchronization signal comprises:
transmitting a secondary synchronization signal (SSS) preamble symbol in the last symbol of the subframe, the SSS preamble symbol having a sequence generated in accordance the at least one revision of the 3GPP LTE communication specification.

5. The method of claim 4, wherein transmitting the preamble synchronization signal comprises:
transmitting a primary synchronization signal (PSS) preamble symbol having a sequence generated in accordance the at least one revision of the 3GPP LTE communication specification.

6. The method of claim 3, wherein the monitoring is performed in the subframe, the preamble transmission is within the subframe and the data burst is within at least the next subframe.

7. The method of claim 6, wherein the data burst is within a plurality of consecutive subframes beginning with the next subframe.

8. The method of claim 7, wherein the control information identifies communication resources within the unlicensed frequency band used for transmitting the data burst.

9. The method of claim 2, wherein the unlicensed frequency band is a frequency band used by devices operating in accordance with one or more revisions of Institute of Electrical and Electronics Engineers (IEEE) 802.11 communication standards.

10. The method of claim 7, wherein the unlicensed band transceiver does not transmit a Discovery Reference Signals (DRS) providing synchronization information to allow the UE device to receive the data burst.

11. An evolved Node B (eNB) comprising:
a licensed band transceiver configured to provide a primary cell (Pcell) and to transmit, to a user equipment (UE) device, control signals within a licensed frequency band using a timing structure comprising frames, subframes, and timeslots, the timing structure in accordance with a communication specification; and
an unlicensed band transceiver configured to provide a secondary cell (Scell) and to transmit to the UE device, a preamble synchronization signal within an unlicensed frequency band using the timing structure within at least a portion of a subframe, at least one symbol of the preamble synchronization signal having a sequence generated in accordance with synchronization signal generation technique used in the Pcell, and at least one symbol of the preamble synchronization signal comprising a preamble reservation symbol that is a cell-specific preamble symbol having a sequence unique to the Scell, the unlicensed band transceiver configured to transmit a data burst within the unlicensed frequency band using the timing structure and within a next subframe immediately after the subframe.

12. The eNB of claim 11, wherein the communication specification is The Third-Generation Partnership Project Long-Term Evolution (3GPP LTE) communication specification and the timing structure is in accordance with at least one revision of the 3GPP LTE communication specification.

13. The eNB of claim 12, the unlicensed band transceiver further configured to:
monitor the unlicensed frequency band;
determine, at least partially based on the monitoring, whether the unlicensed frequency band is in use; and
transmit, from the unlicensed band transceiver, the preamble synchronization signal within the unlicensed frequency band only if the unlicensed frequency band is determined to not be in use.

14. The eNB of claim 12, wherein the unlicensed transceiver is configured to transmit the preamble synchronization signal by:
transmitting a secondary synchronization signal (SSS) preamble symbol in the last symbol of the subframe, the SSS preamble symbol having a sequence generated in accordance the at least one revision of the 3GPP LTE communication specification.

15. The eNB of claim 14, wherein the unlicensed transceiver is configured to transmit the preamble synchronization signal by:
transmitting a primary synchronization signal (PSS) preamble symbol having a sequence generated in accordance the at least one revision of the 3GPP LTE communication specification.

16. The eNB of claim 12, wherein the unlicensed band transceiver monitors the unlicensed frequency band in the subframe, transmits the preamble transmission within the subframe and transmits the data burst within at least the next subframe.

* * * * *